United States Patent [19]

Fothergill

[11] Patent Number: 4,947,177
[45] Date of Patent: Aug. 7, 1990

[54] NARROW BAND CORRELATOR AND NOISE CANCELLOR

[75] Inventor: Noel O. Fothergill, LaSerra, Italy

[73] Assignee: Her Majesty the Queen in right of Canada, as represented by the Minister of National Defence of Her Majesty's Canadian Government, Ottawa, Canada

[21] Appl. No.: 952,248

[22] Filed: Oct. 6, 1978

[30] Foreign Application Priority Data

Apr. 11, 1978 [CA] Canada .................................. 300839

[51] Int. Cl.$^5$ .......................... G01S 7/292; H04B 1/10
[52] U.S. Cl. .................................... 342/378; 367/901; 328/167
[58] Field of Search ............... 328/163, 162, 165, 167; 325/474; 307/520, 529; 342/378, 383, 384; 367/901

[56] References Cited

U.S. PATENT DOCUMENTS

3,299,362 1/1967 Sandberg ........................... 328/163
4,008,439 2/1977 Schroeder ........................... 328/163

*Primary Examiner*—Gilberto Barron, Jr.
*Attorney, Agent, or Firm*—William R. Hinds

[57] ABSTRACT

A narrow band noise cancellor and signal correllator which obtains an increased signal to noise ratio of a received signal from a multi sensor array; the resulting output signal is at double the input frequency. A pair of narrow band similar input signals are added, and subtracted, and the resulting signals are multiplied together. The positive and negative product terms of the signal are separated and the positive term inverted, and the resulting separated signals are individually added with the squared representation of one of the input signals. The resulting added signals are summed and the sum is passed through a narrow band filter having its center frequency at double the input frequency.

9 Claims, 7 Drawing Sheets

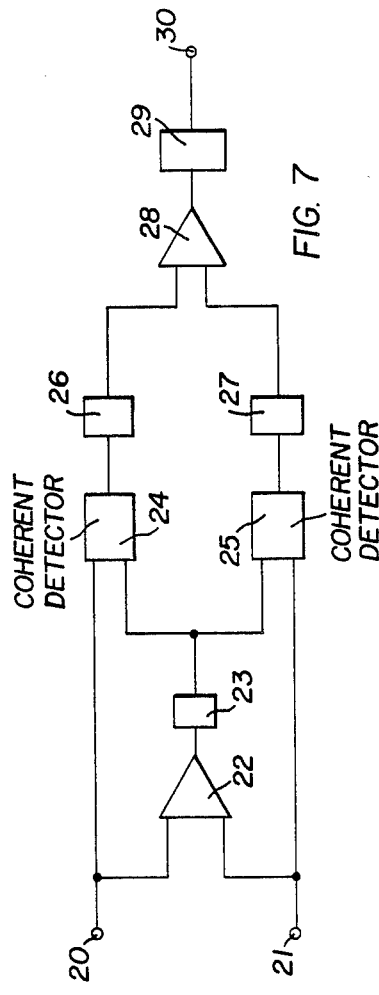
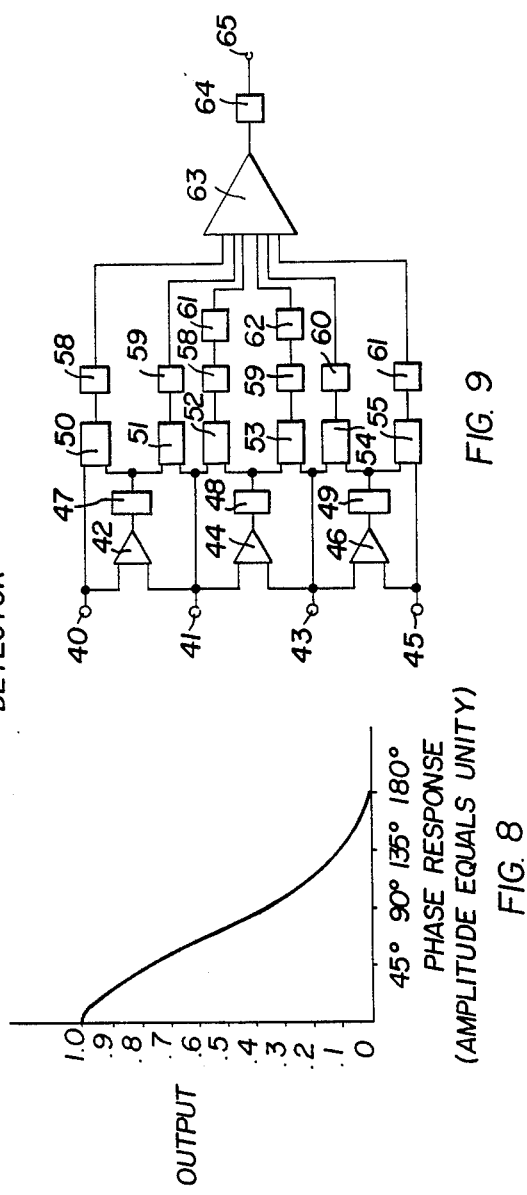

NARROW BAND CORRELATOR AND NOISE CANCELLOR

This invention relates to a signal processor particularly adapted to increase the signal to noise ratio of a received signal, and is particularly useful for the reception of undersea signals, for the reception of radar echoes, etc. in the presence of high noise levels.

It is often essential for the reception of signals having high noise levels to increase the signal to noise ratio to facilitate detection of the signal with any degree of certainty. More than a single signal detector is normally used (for instance, in an array); each of the resulting received signals is composed of the signal to be detected combined with an individual different noise component. Prior art methods of enhancing the signal have teen directed toward adding the input signals, for instance from a pair of input terminals, or toward correlating a pair of input in a cross-correlator. In both cases the improved signal to noise ratio is typically approximately three decibels.

Correlator detection gains have depended on the bandwidth of the input signal, since the noise and detection threshold is known to be given by the expression $$DT = 5 \log \frac{d}{2wT}$$

where
- d = equals a number on the receiver operating characteristic curves determined by the required detection rate probability at a required false alarm rate,
- w = equals the input bandwidth, and
- T = equals the integration time.

Clearly, the detection threshold is desirably lowered with a large value of input bandwidth, for a given integration time.

In passive sonar applications, arrays of signal detectors are normally used to provide many inputs, and adders have been used to combine the signals resulting from the many inputs to form a beam. Pre-detection gains can approach 10 log n where n is the number of elements in an array, providing the signal is fully coherent across the array and provided that the background noise at each element of the array is uncorrelated.

If the signal to be received is narrow band, spectrum analysis of each beam followed by square log detection has been used in the usual processing system. If the signal is broad band, then cross-correlation of two elements or two sub-arrays has been used in the detection system. Time integration to the limits of signal stability is also employed in both detectors to enhance the detectability of weak signals in a high noise background. Correlators using widely spaced elements provide high angular resolution which have been very useful in practice.

However, narrow band correlators are seldom used because in the case of widely separated elements needed for good angular resolution, a large number of equal peaks in response have been found to occur for essentially a single frequency signal as the array is steered in angle, thus preventing the selection of the correct angle containing the signal source. Furthermore, as noted in the above formula for the detection threshold, a small input bandwidth effectively increases the threshold of detection.

I have invented a narrow band non-linear processor which provides an increased signal to noise ratio and which extracts correlated signal from a background of noise by means of partial noise cancellation, and has some characteristics analogous to a correlator and some characteristics analogous to an adder.

The apparatus and method of processing the signal provides means and the functions of adding a narrow band representation of the signal to be detected which is combined with a first noise signal, to a similarly narrow band representation of the signal to be detected which is combined with a second noise signal. At the same time, the signal to be detected, which is combined with the first noise signal is subtracted from the signal to be detected combined with the second noise signal. The resulting signals are multiplied together to provide a product signal. The product signal is then half wave rectified into opposite polarity signals.

The signals to be detected which are individually combined with the noise signals are squared, and one is summed with a negative representation of the rectified product signal and one with an inverted positive representation of the rectified product signal. The summed signal are themselves summed together, and the resulting summed signal are filtered to a narrow bandwidth which has a centre frequency which is double the frequency of the frequency to be detected. The result is an output of the signal to be detected at twice its frequency, but at increased signal to noise ratio.

A better understanding of the invention will be obtained by reference to the following drawings, in which:

FIG. 1 is a block diagram of the preferred form of the invention,

FIGS. 2, 3, 4, 5, and 6 depict waveforms of a signal being processed at various stages, depending on the forms of the input signals, FIG. 7 is a block diagram of a further embodiment of the invention, FIG. 8 is graph of phase response of the embodiment of FIG. 7, and FIG. 9 is a block diagram of an example of a still further embodiment of the invention.

It will be assumed for the description below that there are two signal sensors used to receive a signal to be detected. It will also be assumed that the two input signals from the sensors have been filtered to a narrow bandwidth. For instance, there the signal to be detected is at 200 Hertz, the bandwidth of the signal to be presented to the present inventive structure is preferably between 199 to 201 Hertz, at typically less than one volt amplitude. In general, it is preferably that the bandwidth should be less than 10 percent of the frequency of the signal, and it is further preferred that it be typically 1 percent of the frequency of the signal.

Since there are assumed to be two separate signal detectors such as hydrophones, antennae, etc. for receiving the same signal, it will be understood that the respective noise signals combined therewith are different. There therefore is two narrow bandwidth signals available for processing, $S \pm N_1$ and $S \pm N_2$, where S is the signal to be detected and $N_1$ and $N_2$ are the individual noise signals.

FIG. 1 is a block diagram of the preferred form of the invention to be used as a signal processor. As an example, assume that both input signals S are of the same amplitude and phase. The signal processor of FIG. 1 is comprised of input means having a first input terminal 1 for receiving the signal to be detected combined with one noise signal ($S \pm N_1$). A second input terminal 2 is provided to which the signal to be detected combined with a second noise signal ($S \pm N_2$) is applied.

The two input signals are applied to an adding means 3 for summing the signals from the respective input terminals, and are also applied to a subtracting means 4 for providing a difference signal of the signals from their respective input terminals.

It should be understood that the adding and subtracting means 3 and 4 can be the same kind of structure (such as operational amplifiers) provided that one of the input terminals of the subtracting means contains a series inverter 18 through which signals to that terminals might pass.

The output signals from the adding and subtracting means 3 and 4 are applied to a multiplying means 5 to provide a product signal. The product signal is applied to a pair of half wave rectifiers 6 and 7, to rectify it and obtain a negative and a positive representation of the rectified product signal.

The signal to be detected with the noise signal found in the negative half wave portion ($S \pm N_2$) is squared in a squarer 8, the output of which is applied to adder 9 along with the negative half wave component from rectifier 6; the two signals are added together in the adder 9.

The product signal from multiple 5 had been noted as also being applied to half wave rectifier 7 which produces the positive half wave portion ($S \pm N_1$) of the product signal at its output. The positive half wave signal is inverted in inverter 17 to provide a negative representation of the positive half wave portion of the rectified product signal.

The signal with the noise component which appears in the positive representation of the latter rectified product signal is squared in squarer 10 and the resulting signal is applied to adder 11 with the output of inverter 17, the two signals to be added together.

The output of adders 9 and 11 are applied to respective inputs of adder 12 to produce an output signal at output terminal 13 at double the frequency of the input signal S, but with increased signal to noise ratio.

The processor operates as follows. Assuming that the input signals are $S \pm N_1$ and $S \pm N_2$, the two signals are applied to adding means 3, the output signal thereof being $(S \pm N_1) \pm (S \pm N_2) = 2S \pm N_1 \pm N_2$. The two input signals are also subtracted in subtracting means 4 to provide $S \pm N_1 - S - N_2 = N_1 - N_2$.

The aforenoted output signals from the adding and subtracting means 3 and 4 are multiplied in multiplying means 5 to provide $(2S \pm N_1 \pm N_2) \times (N_1 - N_2) = 2SN_1 - 2N_2 \pm N_1^2 - N_2^2$.

This signal is then applied to half wave rectifier 6 to provide the negative representation of the signal which is applied to it. This half wave rectifier to some extent performs a separation of the positive and negative signal terms. For rectifier 6 the negative term is obtained by the appropriate polarity of the half wave rectifier; its output signal is similar to $-2SN_2 - N_2^2$.

The signal is also applied to half wave rectifier 7, which has its polarity in the opposite direction. Its output signal is the positive term, which is similar to $2SN_1 \pm N_1^2$. This positive polarity signal is then passed through an inverter 17 which in effect changes the positive signs to negative signs.

The input signal which contains the noise terms which appear in the negative representation of the rectified product signal, i.e. from input terminal 2, is squared in squarer 8. Where the signal having this noise component is $S \pm N_2$, the result of the squaring in squarer 8 is $S^2 \pm 2SN_2 \pm N_2^2$. This is added in adder 9 with the negative representation of the rectified product signal to produce the result $S^2 2SN_2 \pm N_2^2 - 2SN_2 - N_2^2 = S^2$.

Similarly the input signal which contains the noise terms which appear in the positive representation of the rectified product signal from terminal 1 is squared in squarer 10. Where the signal having this noise component is $S \pm N_1$, the result of squaring in squarer 10 is $S^2 \pm 2SN_1 - N_1^2$. This is added in adder 11 to the inverted positive representation of the rectified product signal to produce the result $S^2 2SN_1 \pm N_1^2 - 2SN_1 - N_1^2 = S^2$.

The signal $S^2$ is the original signal to be detected, doubled in frequency and squared in amplitude. This formula suggests complete noise cancellation which does not occur completely in practice, since the $N^2$ and SN terms do not practically totally split into positive and negative parts as would be preferred and also as there are harmonic frequencies generated, along with near d.c. difference frequencies. Consequently the $S^2$ signals can be most nearly approached by adding them together in adder 12 to obtain the signal $2S^2$ and passing the resulting signal through a narrow band filter 15 to eliminate as much as possible signals outside the narrow band of the signal to be detected. Since the signal $S^2$ is at twice the frequency, the narrow band filter will have to be centred at $2f_0$, where $f_0$ is the original signal narrow band frequency. The bandwidth of the filter should be about twice the percentage bandwidth as the input bandwidth, to avoid apparent processing gain due to reducing the original bandwidth.

It appears that the actual gain in signal to noise ratio is about 6 decibels at 10% input bandwidth, and greater at 1% input bandwidth. This is a distinct improvement over the conventional adding of two input signals which yields a signal to noise ratio improvement of 3 decibels, at the original frequency.

It should be noted that more than one of the above-described processor circuits can be combined in a processing system, where two or more than two signals and noise components are available, such as would be found as the output of an array of sonar detectors. For instance, processing the signals ($S \pm N_1$), ($S \pm N_2$) and ($S \pm N_3$) two at a time in three different processors summed at the end could yield an additional gain of about 3 decibels in signal to noise ratio. Embodiments using the principle will be described in more detail below.

The effective beamwidth of a multiple element array could be made fairly narrow, due to the phase response of this invention. The resolution available from either a two or three input arrangement using half wavelength element spacing will partly depend on the bandwidths employed as will the signal to noise improvement realizable from the two input processor described with reference to FIG. 1. In a four input processor, for instance, the output of the first and second inputs and the output of the third and fourth inputs can be processed in a second stage. The signal to noise ratio gain achievable for multiple input processing may approach 20 log n decibels, where n is the number of independent inputs, which compares most favourably with a signal to noise gain of 10 log n decibels obtained using additive processing.

Turning to FIG. 2, various example waveforms at various stages in the processing are depicted. Input signals 120 are shown at the left, being of identical amplitude and phase in this example. Waveform 120a is the result of subtraction (and can be seen to be a straight line, or zero) in this case.

The product of the sum and difference signals as the result of multiplying means 5 is shown as zero or straight line waveform 121b. The result of squaring of the input signal 120 in squarer 10 is shown as waveform 121a, which is clearly doubled in frequency. Similarly, the squaring of waveform 120 in square 8 is shown as waveform 121c, which in this case is identical to waveform 121a.

The negative and positive half wave rectified signals (the latter being inverted), are shown as waveforms 122a and 122b, which are simply zero. These do not add anything to waveforms 121a and 121c in adders 9 and 11. Consequently the resulting signals applied to adder 12 are waveforms 123a and 123b. These are combined in adder 12 as described above. Waveforms 123a and 123b are clearly double the frequency of input waveforms 20.

Consider now the waveforms shown in FIG. 3. The input waveforms 120 are 90 degrees out of phase, and are more typical of pure noise signal inputs. The sum and difference signals 120a and 120b are also 90 degrees out of phase. The product of the sum and difference signals are shown as waveform 121b, while the square of the input signals are shown as waveforms 121a and 121c, clearly double the frequency of the input signal.

The inverted positive wave rectification of the product signal is shown as waveforms 122a and 122b. The resulting signals after filtering are shown as waveforms 123a and 123b, which depict energy at about four times the input frequency, which frequency is virtually eliminated in the final filter. There is very little if any energy at double the input frequency.

The situation in which the input signals are out of phase by 90 degrees is representative more typically of noise, rather than signal, at one instant in time. It could also be representative of antenna response or spacing. This example mainly shows the result which is substantial cancellation of noise or signals arriving out of phase at abound 90 degrees.

It will be noted that noise which is close together being in phase or 180 degrees out of phase will pass through the processor, the smallest amplitude being in common to both input signals, being processed as signal-like.

Figure 6:
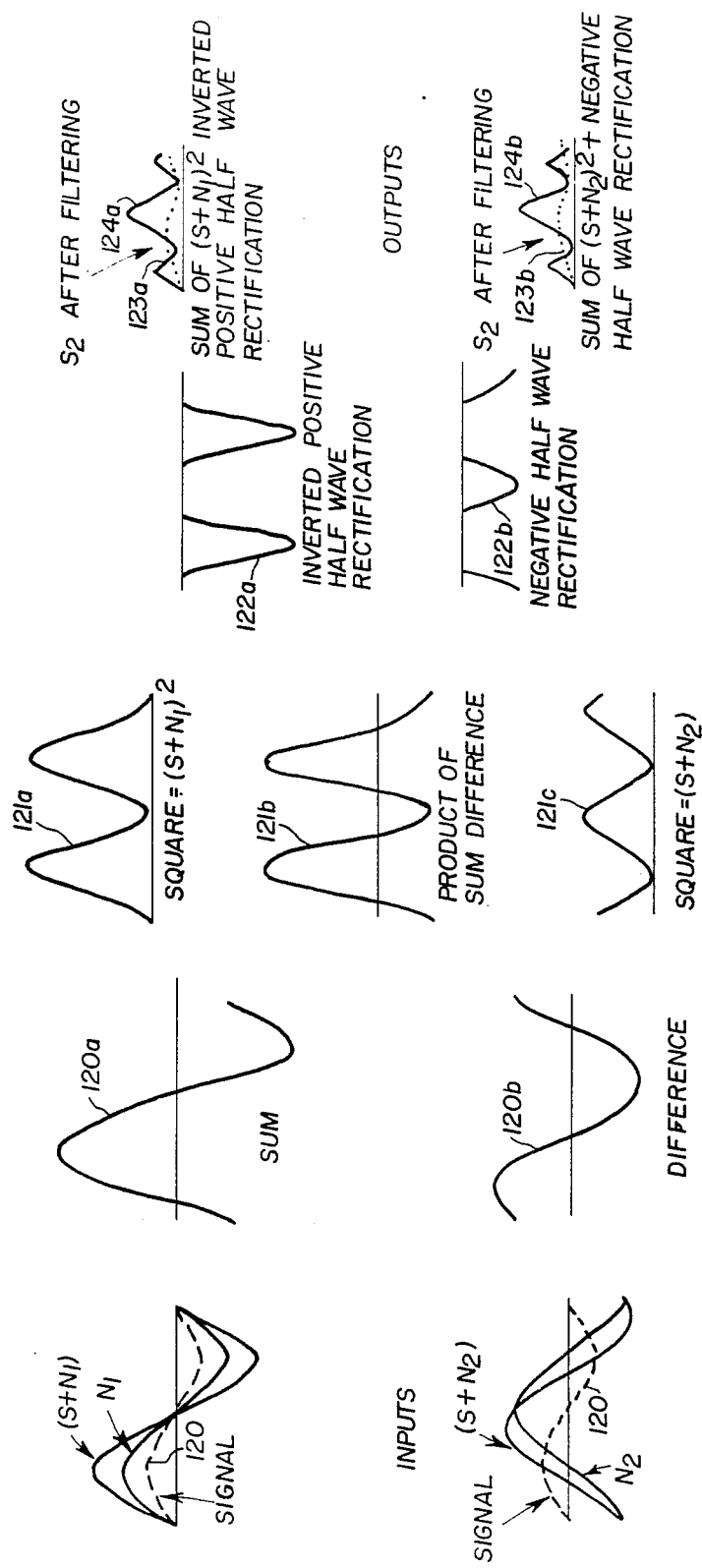

Finally in FIG. 6, a combination of equal high amplitude 90 degrees phase difference noise signals are shown as solid waveforms, as well as dashed-line signal waveforms being in phase, at about 6 decibels below in signal to noise ratio as shown. The signal plus noise is depicted as $(S \pm N_1)$ and $(S \pm N_2)$, while the noise itself is $N_1$ and $N_2$. The output signals to be detected from adders 9 and 11, assuming narrow band filtering to double the frequency of the signal to be received are shown in dotted line as signals 123a and 123b. The signal plus the noise signals 124a and 124b are a combination of four times the input frequency and two times the input four times the input frequency clearly will be eliminated while the signals to be detected are at twice the input frequency. Thus the output signal from the processor is clearly the input signal squared, at two times the The foregoing waveforms are simple examples of the way in which the processor of the present invention works. However a consideration of more complex example would evidence that in those cases the output signals of adders 9 and 11 are not precisely identical in the described simple examples.

It will be understood from a consideration of the above description that the phase response gives a maximum output for a 0 or a 180 degree phase difference of the input signals, and 0 output for a 90 degree or 270 degree phase difference between the inputs. The characteristic of yielding maximum response at 180 degree input phase difference may be highly undesirable for certain applications, such as the processing of an array of sensors such as an array of 2 or more hydrophones where the hydrophone spacing is the usual half wavelength of 180 degrees at the center frequency.

The original circuit also has a statistical distribution of the output amplitude that is undesirably nearly $CHI^2$ rather than gaussian due to the squaring processes used in this circuit. Where only two inputs are used, and if the process includes detection this distribution may be acceptable. However it may be undesirable if many inputs are to be processed and/or if further processing prior to detection is contemplated (e.g. additional narrow band filtering).

Figure 1:
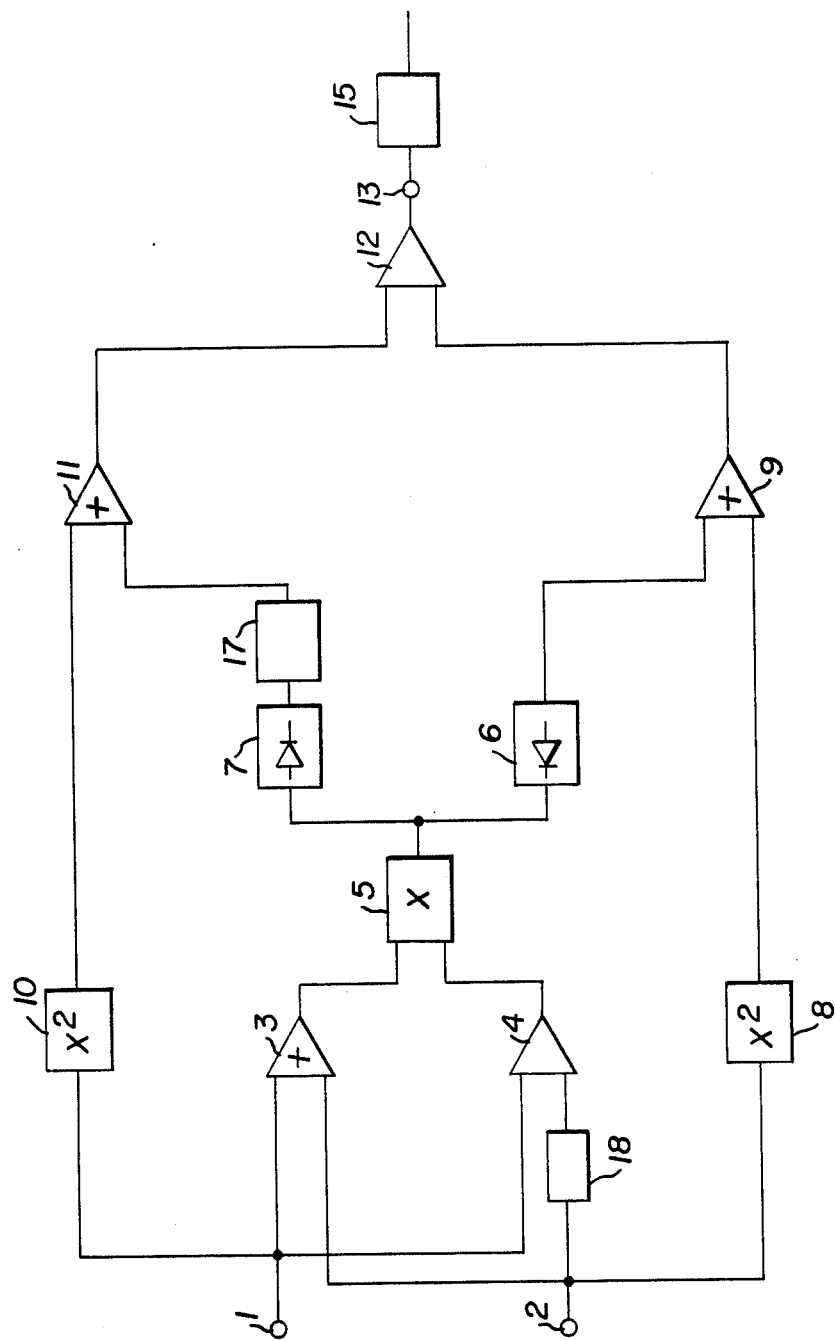
Figure 2:
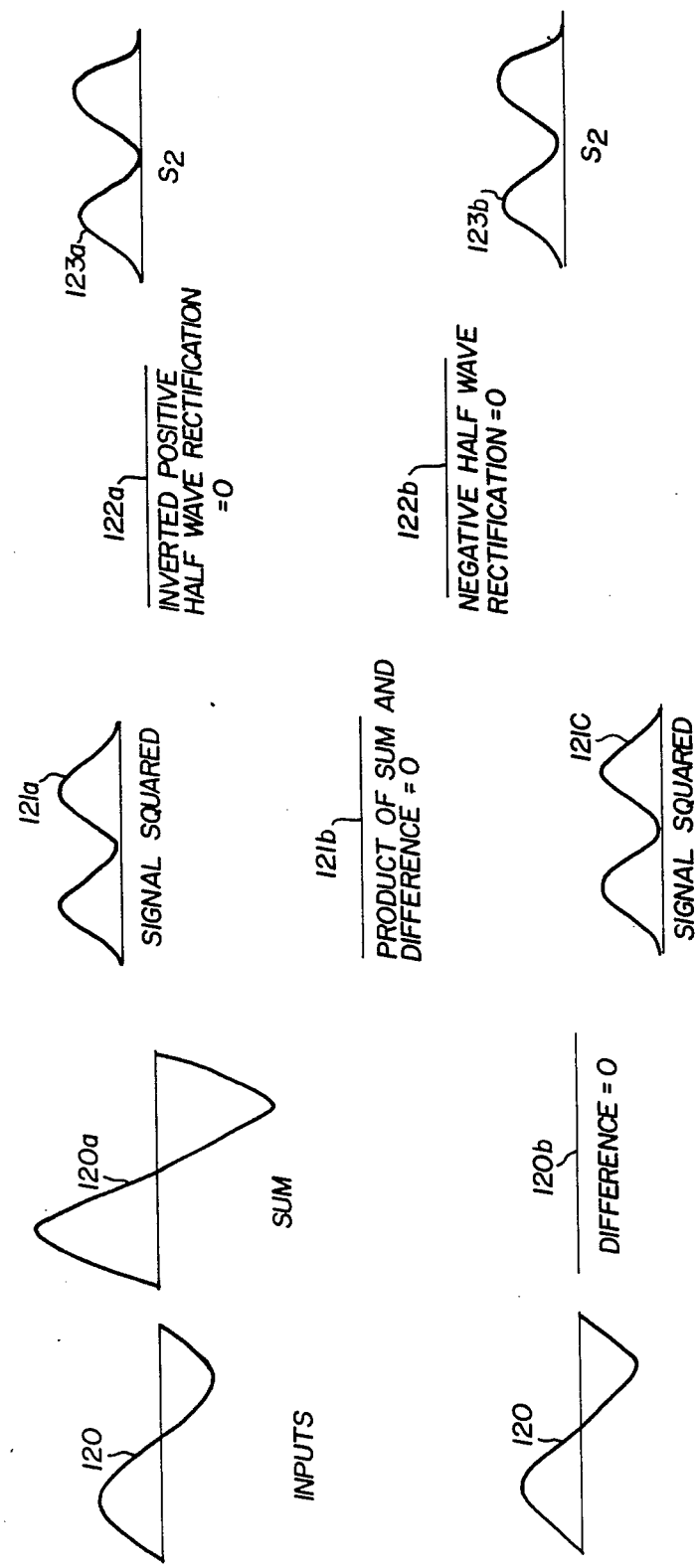
Figure 3:
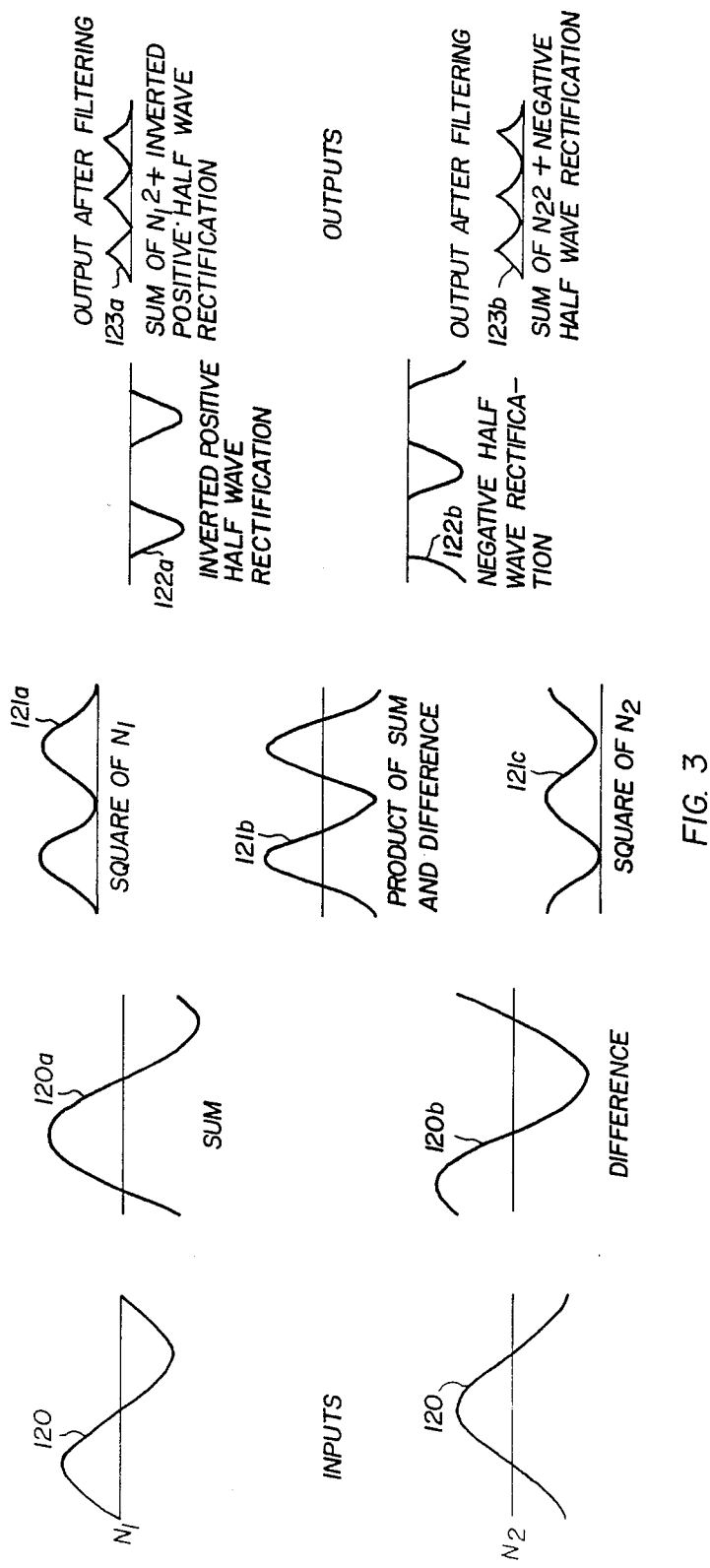
Figure 4:
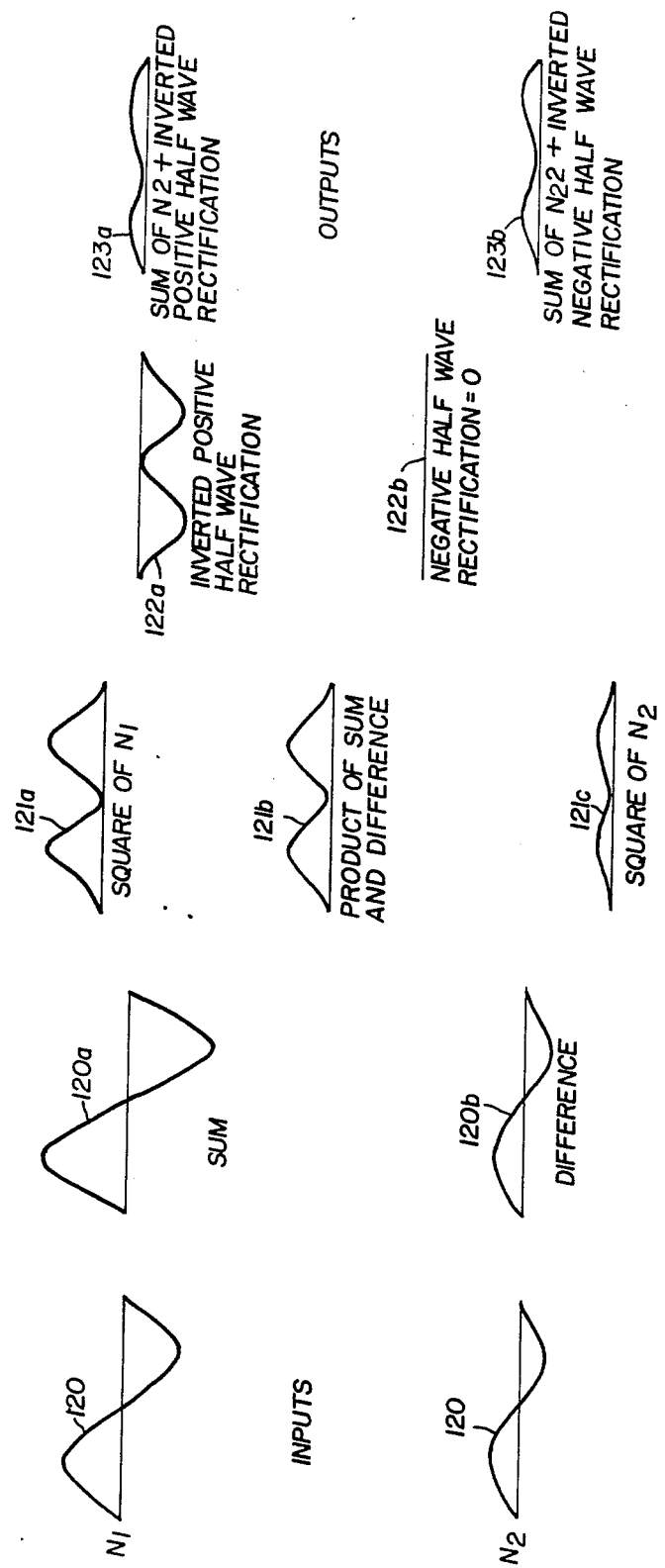
FIG. 4 depicts two input signals in phase, out of different amplitudes, which is more representative of a normal input. Without going in detail through each diagram, since they should now be clear from the figures to a person skilled in the art, it will be noted that the output signals 123a and 123b represent the square of the smallest input amplitude, at double the frequency.
Figure 5:
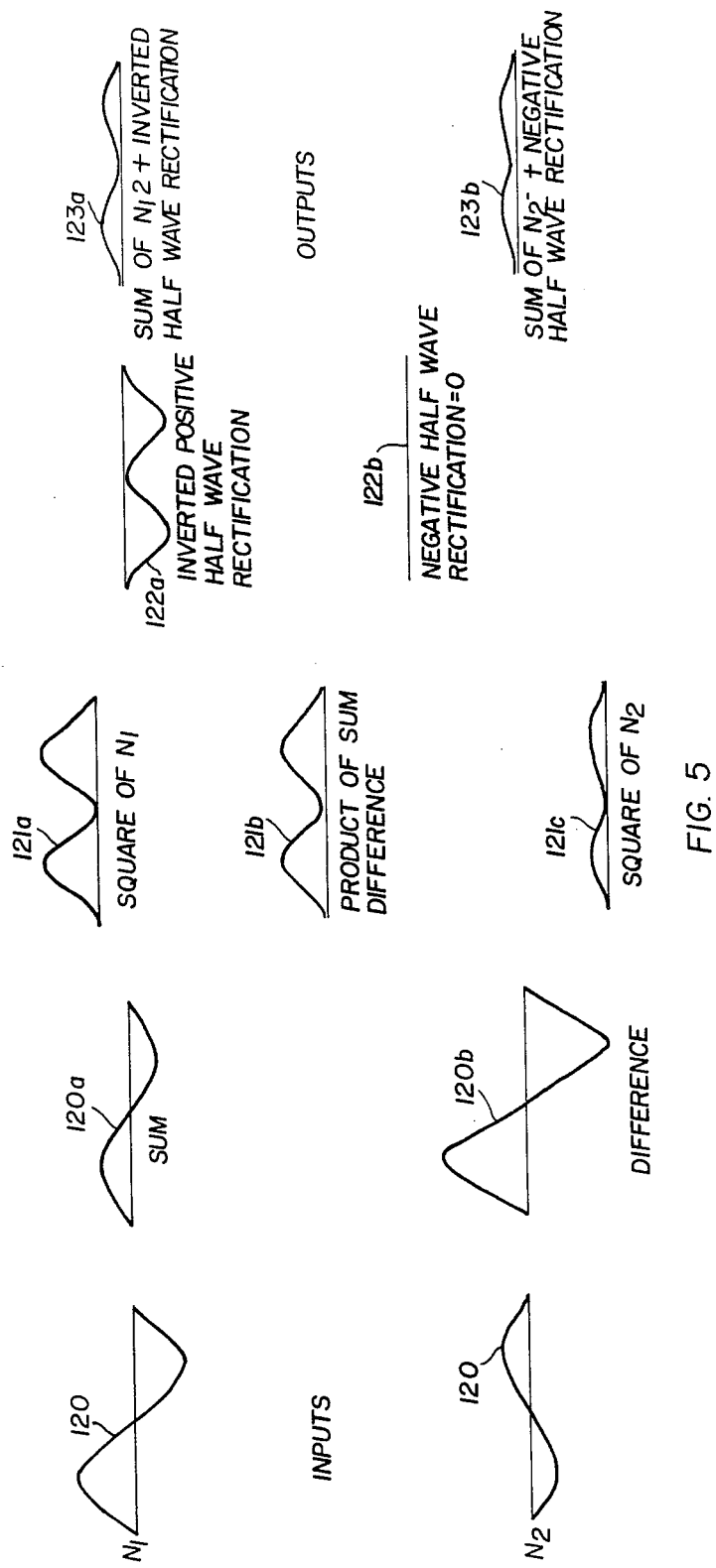
FIG. 5 shows two input waveforms of differing amplitude, and 180 degrees phase difference. Again the square of the smallest amplitude input signal is produced at the output.

FIG. 7 shows a circuit including the invention which provides 0 output when the signals are 180 degrees at a phase. Inputs 20 and 21 are connected to the two inputs of adder 22. The output of adder 22 is connected to the input of a halving network 23. The resulting output signal is applied to one of the two inputs of each cf coherent detectors 24 and 25. Each of the detectors is of the form shown in FIG. 1; the final narrow band filters 26 and 27 are similar to filter 15 of FIG. 1.

Input signals at 20 and 21 are also applied separately to the inputs of coherent detectors 24 and 25.

The output of filters 26 and 27 are connected to inputs of adder 28, the output of which is connected through halving network 29, from which the output signal is taken at output terminal 30.

Signals traversing this circuit have a considerably changed phase response from the one described earlier. The phase response is shown in FIG. 8.

In the case of a 90 degree phase difference between the signals applied to inputs 20 and 21 which are applied to the inputs of adder 22, the output signal of adder 21 would clearly be 45 degrees out of phase with respect to each of the inputs due to the averaging of adder 22. Halving network 23 restores the proper relative amplitude.

Accordingly the final output of adder 28, after passing through having network 27 is approximately 0.32 to the normalized input amplitudes of 1.0.

A consideration of FIG. 8 shows that the phase response at 180 degrees phase difference between the input signals is 0.

Concerning the $CHI^2$ distribution of the output of a two input processor as described above, full normalization or the production of a gaussian distribution appears to be realized when a larger number of inputs are utilized, such as four, or better, six inputs. FIG. 9 is a block diagram of four input systems. Signal inputs 40 and 41 are connected to the inputs of adder 42; signal inputs 41 and 43 are connected, to the inputs of adder 44, and signal inputs 43 and 45 are connected to the inputs of adder 46.

The outputs of adders 42, 44 and 46 are individually connected through halving networks 47, 48 and 49. The output of halving network 47 is connected to one of the inputs of noise canceller 50. The other signal input 40 is connected to the second input of noise canceller 50, and signal input 41 is connected to the second input of noise canceller 51, and to one input of noise canceller 52.

The output of halving network 48 is connected both to a second input of noise canceller 52 and to one of the inputs of noise canceller 53. Signal input 43 is connected to the second input of noise canceller 53 and to one input of noise canceller 54, while the output of halving network 49 is connected to the second input of noise 54 and also to one input of noise canceller 55. Signal input 45 is connected to the second input of noise canceller 55.

The output of each of the noise cancellars 50–55 are individually connected through filters 56, 57, 58, 59, 60 and 61.

The outputs of filters 58 and 59 are individually connected through a x 2 multiplier 61 and 62, the output of which are connected with the outputs of filters 56, 57, 60 and 61 to the input of an adder 63. The output of adder 63 is connected through a "divide by 6" network 64 to an output terminal 65.

The function of the circuit of FIG. 9 is similar to that of FIG. 7, with four inputs, rather than 2. However the plurality of inputs allows a near gaussian output distribution, which is approached more closely as the number of signal inputs increases.

The use of the circuit as shown in FIG. 7 thus overcomes the problem of maximum response for an initial phase difference of 180 degrees and produces a minimum response for that case. This is achieved at the cost of slightly widening the beam width and by increasing the response for 90 degrees initial phase difference of the two input signals from 0 to 0.32 of a normalized input amplitude.

The problem of the output signal being near a $CHI^2$ amplitude statistic limits the use of the circuit of FIG. 7 to a single stage of amplitude discrimination, although it is not a problem if the two processors 24 and 25 include detection as part of their functional application. If it is not, four or more inputs can be used in a circuit as shown in FIG. 9, which usually would be the case where the inputs are available from an antenna or sensor array.

The invention is therefore useful for such applications as small mobile passive arrays for underwater detection, passive ranging sonobuoys, high gain bottom mounted passive arrays, and possible electronic countermeasure applications.

Other embodiments and variations may now become evident to a person skilled in the art, after reading this specification. All such variations and embodiments are considered within the scope of this invention, as defined in the appended claims.

The embodiments of the invention in which an exclusive property or privilege is claimed are defined as follows:

1. A signal processor comprising:
   (a) input means for receiving a narrow bandwidth signal to be detected combined with a first noise signal at one input terminal, and said signal to be detected combined with a second noise signal at a second input
   (b) adding means for providing a sum of the signals received at said terminals,
   (c) subtracting means for providing a difference signal of the signals received at the respective said input terminals,
   (d) multiplying means for providing a product signal of the sum and difference signals,
   (e) means for half wave rectifying the product signal to two rectified signals of opposite polarity, and for inverting the positive polarity rectified signal,
   (f) means for individually squaring the signal from each of said input terminals,
   (g) means for summing the inverted positive polarity rectified signal with a corresponding squared signal, and the negative polarity rectified signal with a corresponding squared signal, and
   (h) second adding means for adding the summed signals together.

2. A signal processor as defined in claim 1, further including narrow band filter means having its centre frequency at twice the frequency of the signal to be detected, for filtering the output of the second adding means, and providing at its output said signal to be detected at twice its frequency, and increased signal to noise ratio.

3. A signal processor as defined in claim 2, the input means comprising a first signal source connected to one input of the processor and to one input of a third adding means, the output of the third adding means being connected through a signal halving network to the second input of the processor, and a second signal source connected to a second input of the third adding means; further including a second signal processor as defined in claim 2 having one input terminal connected to the second signal source and its second input terminal connected to the output of the halving network, the output of each of the signal processors being connected to the inputs of a fourth adding means.

4. A signal processor as defined in claim 3, further comprising a signal halving network connected to the output of the fourth adding means.

5. A signal processor comprising first means for adding a pair of narrow band similar input signals and second means for subtracting the pair of input signals, third means for multiplying the output of the first and second means to provide a product signal, fourth means for separating the positive and negative terms of the product signal, first adder means for adding an inverted representation of said positive terms to a squared representation of one of the input signals, second adder means for adding said negative terms to a squared representation of the other of the input signals, and means for summing the output signals of the first and second adder means.

6. A signal processor as defined in claim 5, further including a narrow band filter means connected to the output of the means for summing, the center frequency of the filter means being at twice the frequency of the input signals.

7. A signal processor as defined in claim 2, 3 or 6, in which the bandwidth of the filter means is not greater than about 10% of its center frequency.

8. A signal processor as defined in claim 2, 3 or 6 in which the bandwidth of the filter means is not greater than about 1% of its center frequency.

9. A method of processing a signal comprising:
(a) adding a narrow band representative of a signal to be detected which is combined with a first noise signal to a similarly narrow band representation of said signal to be detected which is combined with a second noise signal,
(b) simultaneously with step (a) subtracting said narrow band representation of the signal to be detected combined with the first noise signal from said narrow band representation of the signal to be detected combined with the second noise signal,
(c) multiplying together both the resulting added and subtracted signals to provide a product signal,
(d) half wave rectifying the product signal into opposite polarity signals,
(e) squaring said signals to be detected combined with each of said noise signals which is contained in the half wave rectified product signal,
(f) summing an inverted positive and a negative representation of the rectified product signal individually with said squared signals to be detected combined with said noise signals,
(g) summing the summed signals from step (f), and
(h) filtering a resulting summed signal produced in step (g) to a narrow band at a centre frequency double the frequency of said frequency to be detected, to provide at an output said signal to be detected at twice the frequency, and with increased signal to noise ratio.

* * * * *